United States Patent
Caporale et al.

(10) Patent No.: US 10,311,264 B1
(45) Date of Patent: Jun. 4, 2019

(54) PRINTED RFID TAG ANTENNA ARRAY WITH INTERFERING SUBARRAYS

(71) Applicant: XEROX CORPORATION, Norwalk, CT (US)

(72) Inventors: Christopher P. Caporale, Rochester, NY (US); Alberto Rodriguez, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/967,255

(22) Filed: Apr. 30, 2018

(51) Int. Cl.
*G06K 7/10* (2006.01)

(52) U.S. Cl.
CPC ..... *G06K 7/10316* (2013.01); *G06K 7/10356* (2013.01)

(58) Field of Classification Search
None
See application file for complete search history.

(56) References Cited

U.S. PATENT DOCUMENTS

| | | | | |
|---|---|---|---|---|
| 5,450,492 A * | 9/1995 | Hook | ................... | G06K 7/0008 340/10.2 |
| 6,812,824 B1 | 11/2004 | Goldinger et al. | | |
| 7,098,794 B2 * | 8/2006 | Lindsay | ............. | G06K 19/0716 340/539.26 |
| 7,187,288 B2 * | 3/2007 | Mendolia | ................... | G01S 5/04 340/572.1 |
| 7,256,695 B2 * | 8/2007 | Hamel | ................... | A61F 2/4657 340/572.1 |
| 7,791,409 B2 * | 9/2010 | Arrigo | ...................... | H03J 1/10 329/363 |
| 7,900,844 B2 * | 3/2011 | Alden | ............... | G06K 19/07749 235/375 |
| 8,089,409 B2 | 1/2012 | Shibata | | |
| 8,497,762 B2 * | 7/2013 | Campero | ................ | G01S 13/74 340/10.1 |
| 8,502,675 B2 * | 8/2013 | Hamel | ...................... | H04Q 9/00 340/10.1 |
| 10,088,547 B1 * | 10/2018 | Seitz | ........................ | G01S 3/043 |
| 2004/0160367 A1 * | 8/2004 | Mendolia | ............... | H01Q 1/521 343/700 MS |
| 2005/0243527 A1 * | 11/2005 | Jandzio | .................... | H01Q 3/26 361/760 |
| 2006/0255941 A1 * | 11/2006 | Carrender | .......... | G01R 31/2822 340/572.1 |
| 2006/0279458 A1 * | 12/2006 | Mohamadi | ........... | H01Q 1/2216 342/368 |

(Continued)

*Primary Examiner* — Daniel I Walsh
(74) *Attorney, Agent, or Firm* — MH2 Technology Law Group LLP (57) ABSTRACT

A radio frequency identification (RFID) technique is disclosed. The technique includes a printed RFID antenna array including at least three printed RFID antenna elements and an RFID reader device with at least one RFID reader antenna sized to transmit excitation energy to a number N>1 of printed RFID antenna elements of the printed RFID antenna array, where N is less than a total number of printed RFID antenna elements of the printed RFID antenna array. The RFID reader antenna is configured to receive a plurality of compound signals from respective subarrays consisting of N of the printed RFID antenna elements of the printed RFID antenna array. The RFID reader device also includes a demodulator, a decoder, and an output interface.

20 Claims, 4 Drawing Sheets

(56) References Cited

U.S. PATENT DOCUMENTS

| | | | | |
|---|---|---|---|---|
| 2007/0024506 A1* | 2/2007 | Hardacker | ............... | H01Q 1/38 343/700 MS |
| 2007/0254603 A1* | 11/2007 | Li | ......................... | H04B 7/0632 455/88 |
| 2007/0262866 A1* | 11/2007 | Eveland | ........... | G06K 19/07749 340/572.7 |
| 2008/0030418 A1* | 2/2008 | Brachat | .................. | H01Q 9/285 343/810 |
| 2008/0145560 A1* | 6/2008 | Khaselev | ............... | C09D 11/30 427/466 |
| 2008/0186180 A1* | 8/2008 | Butler | ................ | G06K 19/0723 340/572.1 |
| 2008/0198022 A1* | 8/2008 | Battles | ..................... | B41M 5/52 340/572.8 |
| 2009/0102120 A1* | 4/2009 | Hou | .......................... | A63F 9/10 273/153 R |
| 2009/0128290 A1* | 5/2009 | Chopra | ............. | G06K 19/0672 340/10.1 |
| 2009/0212921 A1* | 8/2009 | Wild | ..................... | G01S 13/756 340/10.5 |
| 2010/0277320 A1* | 11/2010 | Gold | .................... | G06K 19/041 340/572.1 |
| 2011/0012713 A1* | 1/2011 | Wilkinson | ......... | G06K 7/10178 340/10.3 |
| 2011/0080267 A1* | 4/2011 | Clare | ...................... | G01S 13/82 340/10.4 |
| 2011/0090130 A1* | 4/2011 | Choi | .................... | G06K 7/0008 343/770 |
| 2011/0151810 A1* | 6/2011 | Su | ......................... | H01Q 3/242 455/129 |
| 2011/0279232 A1* | 11/2011 | Tuttle | ................ | G06K 19/0723 340/10.1 |
| 2013/0212694 A1* | 8/2013 | Castiglia | ................. | G06F 21/60 726/26 |
| 2013/0284813 A1* | 10/2013 | Cok | ..................... | G06K 19/067 235/492 |
| 2014/0138446 A1* | 5/2014 | Wu | .................... | G06K 19/0775 235/492 |
| 2015/0069133 A1* | 3/2015 | Qian | ..................... | G06K 19/02 235/492 |
| 2015/0310327 A1* | 10/2015 | Karmakar | ............ | H01Q 1/2225 340/10.1 |
| 2016/0358058 A1* | 12/2016 | Gibson | ............. | G06K 19/0672 |
| 2017/0132438 A1* | 5/2017 | Cletheroe | ......... | G06K 7/10128 |
| 2017/0140258 A1* | 5/2017 | Gibson | ............. | G06K 19/07773 |
| 2017/0141115 A1* | 5/2017 | Bower | .................. | H01Q 23/00 |
| 2018/0027647 A1* | 1/2018 | Rengarajan | .......... | H05K 1/0216 342/175 |
| 2018/0322319 A1* | 11/2018 | Gibson | ............. | G06K 7/10069 |

* cited by examiner

PRINTED RFID TAG ANTENNA ARRAY WITH INTERFERING SUBARRAYS

FIELD

This disclosure relates generally to radio frequency identification ("RFID") systems.

BACKGROUND

Printed RFID tags, which lack computer chips, are a low cost alternative to passive or active RFID tags, which include computer chips. In contrast to passive or active RFID tags, printed RFID tags are both more efficient and more economical to fabricate and deploy. However, issues with existing printed RFID tags include relatively low memory density, relatively high cost of reading, and the inability to rewrite data after being printed.

SUMMARY

According to various embodiments, a radio frequency identification (RFID) system is provided. The system includes a printed RFID antenna array including at least three printed RFID antenna elements on a substrate; an electronic RFID reader device including at least one RFID reader antenna, at least one the at least one RFID reader antenna being an RFID transmit antenna sized to transmit excitation energy to a number N>1 of printed RFID antenna elements of the printed RFID antenna array, where N is less than a total number of printed RFID antenna elements of the printed RFID antenna array; where the at least one RFID reader antenna is configured to receive a first compound signal from a first plurality consisting of N of the printed RFID antenna elements of the printed RFID antenna array when the printed RFID antenna array is positioned at a first reading location relative to the RFID transmit antenna; where the at least one RFID reader antenna is configured to receive a second compound signal from a second plurality consisting of N of the printed RFID antenna elements of the printed RFID antenna array when the printed RFID antenna array is positioned at a second reading location relative to the RFID transmit antenna, where the first plurality is different from the second plurality; an electronic demodulator communicatively coupled to an output of the RFID antenna reader and configured to demodulate the first compound signal and the second compound signal and produce a first encoded signal and a second encoded signal; and an electronic decoder communicatively coupled to an output of the electronic demodulator and configured to obtain read data from at least the first encoded signal and a second encoded signal, where the read data is representative of the printed RFID antenna array.

Various optional features of the above embodiments include the following. The at least one RFID reader antenna may configured to receive at least one additional compound signal from at least one additional plurality consisting of N of the printed RFID antenna elements of the printed RFID antenna array when the printed RFID antenna array is positioned at at least one additional reading location relative to the RFID transmit antenna; the electronic demodulator may be configured to demodulate the at least one additional compound signal to produce at least one additional encoded signal; and the electronic decoder may be configured to obtain the read data from the first encoded signal, the second encoded signal, and the at least one additional encoded signal. Each of the at least three printed RFID antenna elements may include a patch antenna element and a microstrip transmission line. The first encoded signal and the second encoded signal may encode the read data in amplitude and phase information, and the decoder may determine the read data from the amplitude and phase information. The decoder may include a Quadrature Amplitude Modulation (QAM) decoder. The QAM decoder may include a 16QAM decoder. The substrate may include paper, and the printed RFID antenna array may lack a microchip. The printed RFID antenna array may have an antenna element density of at least 50 printed RFID antenna elements per square inch. The first plurality consisting of N of the printed RFID antenna elements of the printed RFID antenna array may share a common printed RFID antenna element with the second plurality consisting of N of the printed RFID antenna elements of the printed RFID antenna array. The at least three printed RFID antenna elements may be arranged linearly on the substrate.

According to various embodiments, a method of reading a printed radio frequency identification (RFID) antenna array including at least three printed RFID antenna elements on a substrate is provided. The method includes providing at least one RFID reader antenna, at least one of the at least one RFID reader antenna being an RFID transmit antenna sized to transmit excitation energy to a number N>1 of printed RFID antenna elements of the printed RFID antenna array, where N is less than a total number of printed RFID antenna elements of the printed RFID antenna array; receiving, by at least one RFID reader antenna, a first compound signal from a first plurality consisting of N of the printed RFID antenna elements of the printed RFID antenna array upon the printed RFID antenna array being positioned at a first reading location relative to the RFID transmit antenna; receiving, by the at least one RFID reader antenna, a second compound signal from a second plurality consisting of N of the printed RFID antenna elements of the printed RFID antenna array upon the printed RFID antenna array being positioned at a second reading location relative to the RFID transmit antenna, where the first plurality is different from the second plurality; demodulating, by electronic demodulation circuitry, the first compound signal and the second compound signal to obtain a first encoded signal and a second encoded signal; decoding, by electronic decoding circuitry, at least the first encoded signal and the second encoded signal to obtain read data.

Various optional features of the above embodiments include the following. The method may include receiving at least one additional compound signal from at least one additional plurality consisting of N of the printed RFID antenna elements of the printed RFID antenna array when the printed RFID antenna array is positioned at at least one additional reading location relative to the RFID transmit antenna; and demodulating the at least one additional compound signal to produce at least one additional encoded signal; where the decoding includes decoding at least the first encoded signal, the second encoded signal, and the at least one additional encoded signal to obtain the read data. Each of the at least three printed RFID antenna elements may include a patch antenna element and a microstrip transmission line. The first encoded signal and the second encoded signal may encode the read data in amplitude and phase information, and the decoding may include determines the read data from the amplitude and phase information. The decoder may include a Quadrature Amplitude Modulation (QAM) decoder. The QAM decoder may include a 16QAM decoder. The substrate may include paper, and the printed RFID antenna array may lack a microchip.

The printed RFID antenna array may have an antenna element density of at least 50 printed RFID antenna elements per square inch. The first plurality consisting of N of the printed RFID antenna elements of the printed RFID antenna array may share a common printed RFID antenna element with the second plurality consisting of N of the printed RFID antenna elements of the printed RFID antenna array. The at least three printed RFID antenna elements may be arranged linearly on the substrate.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention might be practiced. These embodiments are described in sufficient detail to enable those skilled in the art to practice the invention and it is to be understood that other embodiments might be utilized and that changes might be made without departing from the scope of the invention. The following description is, therefore, merely exemplary.

Some embodiments utilize RFID antenna arrays (for an RFID tag) to modulate a carrier signal using constructive and destructive interference to have a selected amplitude and phase response at a receive antenna of an RFID reader device. This is done by using an RFID reader device transmit antenna to excite multiple strict subsets of printed antenna elements of the RFID antenna array. The antenna elements of each subset modulate the signal. Based on the configuration of the antenna elements within the array, the modulated signals interfere with each-other, thereby producing compound signals. These compound signals from each subset of antennal elements are received by a receiving antenna of the RFID reader device, the carrier waves are demodulated, and the resulting data is decoded. These features are described in detail below, as well as various optional alterations and additions.

Figure 1:
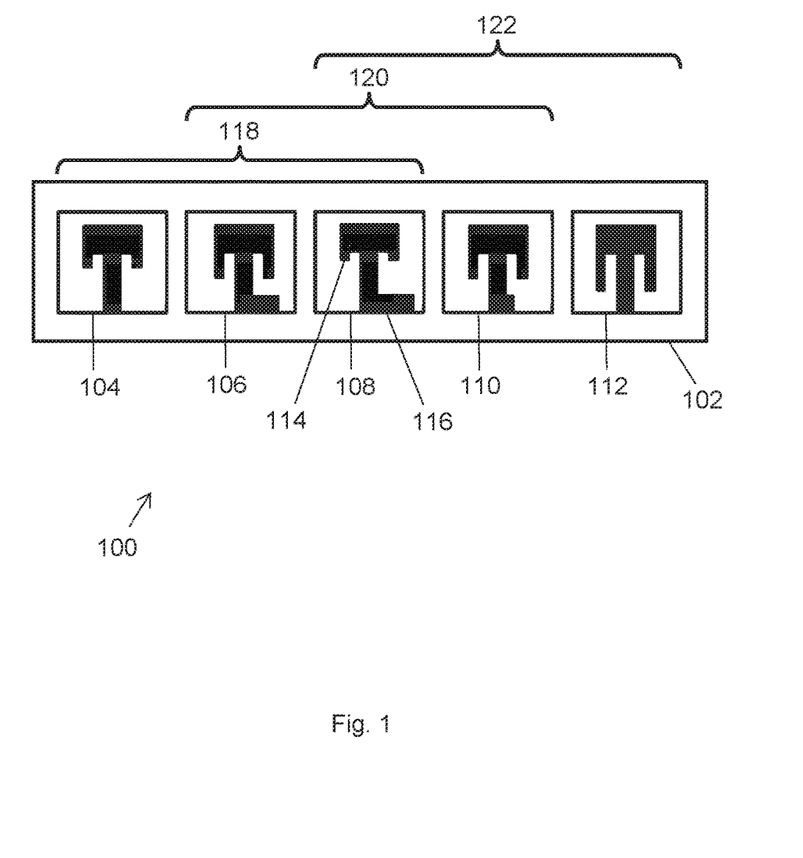
FIG. 1 is a schematic diagram of a printed radio frequency identification (RFID) tag antenna array according to various embodiments.

FIG. 1 is a schematic diagram of a printed radio frequency identification (RFID) antenna array 100 for an RFID tag according to various embodiments. Before embarking on a detailed description of printed RFID antenna array 100, a description of basic printed RFID systems is presented.

In general, basic printed RFID systems provide an efficient technique for of tracking a variety of objects and entities. Printed RFID systems are much more economical than traditional active or passive RFID systems and can be customized from a specialized printer (e.g., as opposed to requiring silicon fabrication). As used herein, the terms "passive" and "active" refer to RFID tags that include computer chips, with the former lacking a power source and the latter including a power source. These terms are also used to refer to RFID systems that utilize such tags. Printed RFID systems have an advantage of range over passive RFID systems, and a big cost advantage over both active and passive RFID systems. Their main drawbacks are the memory depth and the one time nature of programming their memories.

In general, basic printed RFID systems include two components: (1) one or more printed RFID tags, which include a printed RFID antenna element that is used to transmit information encoded in the RFID tag to a reader, but lack a computer chip and power source, and (2) a reader device, which includes a transmit antenna and a receive antenna (which may be a single transmit/receive antenna), as well as demodulation and decoding circuitry.

In operation, the transmit antenna of an RFID reader device radiates out a signal that is linearly polarized with zero rotation of the fields and with a zero phase. When this signal reaches an antenna element of the RFID tag being read, the antenna element is excited by the pulse and radiates back, modulating the phase and/or polarization of the transmitted signal. Based on properties and configuration of the antenna element, which may be a microstrip patch or other antenna, there is a polarization shift in the traveling electric and magnetic fields, due to the way in which the electric and magnetic fields align with the feeding element of the antenna. When this is received by the receive antenna of the reader device (which may be the same as the transmit antenna), the rotation of the polarization is determined and the first bit of information is decoded from the polarization information. Another bit of information may be decoded from the phase shift of the signal. Additional data can be determined from the amplitude of the electrical and magnetic fields returned by the antenna elements in the printed RFID tag. Thus, using the in-phase and quadrature components of the signal returned by the printed RFID tag, the RFID reader device can determine the amplitude of the signal, as well as its phase and polarization. The reader device can decode this information to obtain the data encoded by the printed RFID tag.

Importantly, traditional RFID systems (printed, passive, and active) utilize RFID tags with antenna elements that are sufficiently spaced apart so as to avoid producing interfering signals when excited by the antenna of a reader device. That is, existing RFID systems use one or more of amplitude, phase, and polarization of a single antenna in an RFID tag to carry information. Consequently, such traditional antenna elements must be placed at a distance greater than one-half of the wavelength of the carrier frequency, so that the reflected, modulated signals that they produce do not interfere with each-other.

In contrast, some embodiments allow for more antennas to be packed in a given area. For example, existing RFID systems that utilize 2.5 mm patch antenna elements separated by at least 5 mm (half the wavelength of the carrier frequency) can pack about 25 antennas per square inch. Some embodiments significantly improve antenna density per square inch to between 49 and 81 (or more) antennas. This additional antenna density translates into a similar increase in encoded data. That is, some embodiments significantly improve memory depth for passive printed chipless RFID systems.

Turning to back FIG. 1, note that printed RFID antenna array 100 may be implemented on substrate 102 shaped and configured for convenient attachment (e.g., to an item to be tracked) or handling (e.g., by a human using the RFID tag that includes it as a credential). Printed RFID antenna array 100 include a plurality of antenna elements 104, 106, 108, 110, 112 which may be patch antenna elements, simple diploe antenna elements, zig-zag antenna elements, etc. (For purposes of illustration, embodiments are described in reference to patch antenna elements; however, such description is non-limiting as other antenna elements may be used in the alternative. Further, although FIG. 1 illustrates inset feed path antenna elements, other types of patch antenna elements may be used, such as edge feed patch antenna elements.) Each antenna element 104, 106, 108, 110, 112 includes features that modulate a received signal from a reader antenna in certain defined ways. In particular, each antenna element 104, 106, 108, 110, 112 may modulate a carrier waver received from an antenna of a reader device to have a particular amplitude and phase.

Each antenna element 104, 106, 108, 110, 112 is configured to have a particular associated resonant frequency, phase shift, and amplitude. When excited at the resonant frequency, each antenna element 104, 106, 108, 110, 112 modulates the signal with its particular phase shift and amplitude.

The amplitude (and resonant frequency) of a given antenna element can be set by configuring the length and width of its patch (e.g., patch 114 of antenna element 108) using known techniques. In more detail, the amplitude can be manipulated by tuning the antenna such that the resonant element only transmits 25%, 50%, 75%, etc. depending on the return loss of the element, e.g., at 60 GHz. For example, a −3 dB return loss only receives 50% power, therefore the reflected or transmitted energy back will only be half of the optimal power. Amplitude can also be manipulated by slightly mismatching the transmission line (e.g., transmission line 116 of antenna element 108) to the antenna. This results in a loss of power from non-optimal energy transfer. Equations (1), (2), (3), and (4) below set forth these observations in actionable, mathematical terms.

$$A_x = A_0 \cos\theta \quad (1)$$

$$A_y = A_0 \sin\theta \quad (2)$$

$$A_0 = \sqrt{A_x^2 + A_y^2} \quad (3)$$

$$\theta = \tan^{-1}\frac{A_x}{A_y} \quad (4)$$

In Equations (1), (2), (3), and (4), $\theta$ represents the phase, $A_x$ represents the in-phase amplitude at signal phase $\theta$, $A_y$ represents the out-of-phase (e.g., quadrature) amplitude at signal phase $\theta$, and $A_0$ represents the amplitude of the signal.

The phase shift of a given antenna element can be set by configuring its transmission line (e.g., transmission line 116 of antenna element 108) with a certain length, which determines the phase shift of the modulated, reflected signal. Equation (5) below shows the relationship between phase, wavelength and transmission line length.

$$\theta = \frac{2\pi L}{\lambda} \quad (5)$$

In Equation (5), $\theta$ represents phase, $\lambda$ represents wavelength, and L represents the length of the transmission line for the antenna element at issue.

Thus, Equations (1), (2), (3), (4) and (5), above, may be used to determine physical parameters of individual antenna elements so that antenna elements so configured modulate an RFID reader transmit antenna's signal to have the selected amplitude and phase characteristics controlled by the antenna elements' physical properties.

According to some embodiments, a reader device transmit antenna may excite multiple antenna elements simultaneously, producing individual signals that constructively and destructively interfere with each other so as to generate a compound signal that is read by the reader device receive antenna. Multiple such compound signals can be obtained from different groups of antenna elements by changing the relative positons of the RFID tag and RFID reader device. The data obtained from these multiple compound signals can be combined to obtain a relatively large amount of data from an RFID tag with a relatively small surface area.

In reference to FIG. 1, embodiments may utilize an RFID reader device transmit antenna that produces a carrier wave that excites more than one antenna element in antenna array 100 at a time. For example, an embodiment may utilize a RFID reader device transmit antenna that excites three antenna elements at a time. (In describing fewer than a total number of antenna elements in an antenna array, this disclosure uses the term "subarray".) Such an antenna may be moved relative to RFID antenna array 100 (or antenna array 100 relative to the transmit antenna) to excite subarray 118 consisting of antenna elements 104, 106, 108, then excite subarray 120 consisting of antenna elements 106, 108, 110, and then excite subarray 122 consisting of antenna elements 108, 110, 112. That is, such an antenna may successively read antenna elements 104, 106, 108 of subarray 118, antenna elements 106, 108, 110 of subarray 120, and antenna elements 108, 110, 112 of subarray 122.

A general equation for the compound signals produced by subarrays in antenna arrays with sequentially arranged antenna elements, such as antenna array 100, is provided below. Equation (6) is not limited to describing only antenna array 100, and instead may be used for any sequential array of antenna elements enumerated 1, 2, 3, 4, . . . , where signals from n elements interfere with each other at a time, i.e., where the subarrays each have n elements.

$$r[i] = \sum_{k=i}^{i+n} A_k \sin(2\pi t + \theta_k) \quad (6)$$

In Equation (6), r[i] represents the compound signal obtained from the subarray with elements numbered i, i+1, i+2, . . . , i+n. The term $A_k$ represents the amplitude of the signal produced by antenna element k. The term t represents time, and the term $\theta_k$ represents the phase shift produced by antenna element k.

Applying Equation (6) to antenna array 100 of FIG. 1 with successive RFID readings performed on subarrays 118, 120, and 122 would have n=3 and i ranging from 1 to 3 such that compound signals r[1], r[2] and r[3] represent the readings from sub-arrays 118, 120, and 122, respectively.

A technique for configuring antenna elements of an array so that its subarrays produce any desired compound signal is presented in reference to FIG. 2, below.

Figure 2:
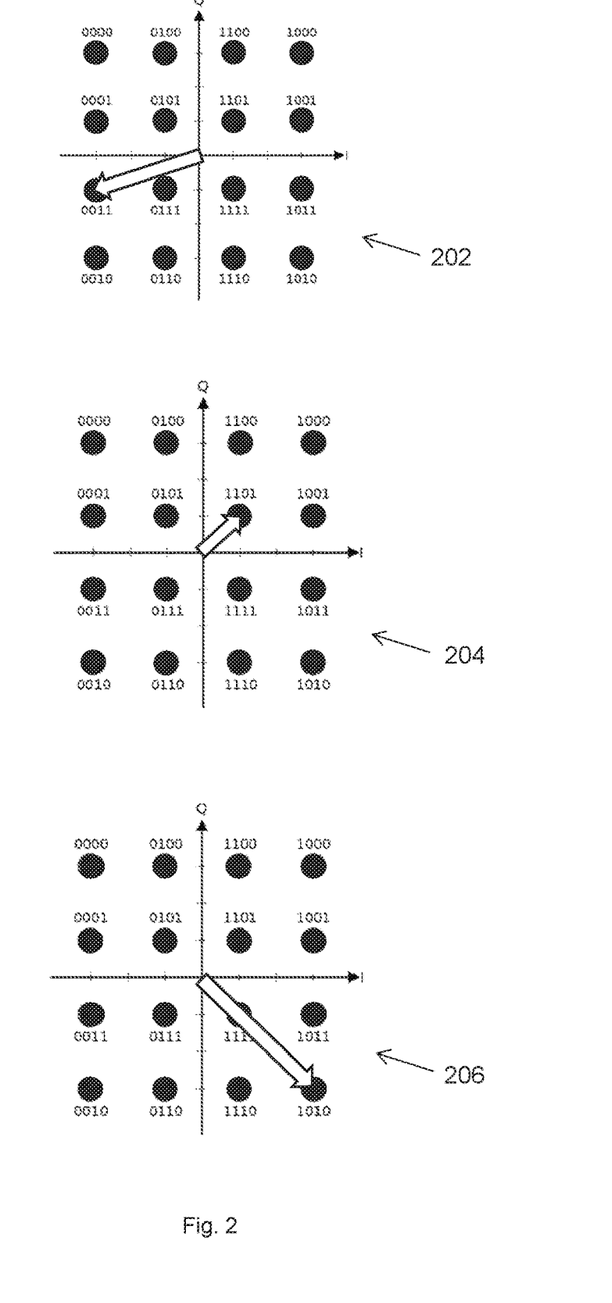
FIG. 2 presents annotated 16QAM constellation diagrams that illustrate a technique for encoding data in subarrays of a printed RFID tag antenna array according to various embodiments.

FIG. 2 presents annotated 16QAM constellation diagrams 202, 204, 206 that illustrate a technique for encoding data in subarrays of a printed RFID tag antenna array according to various embodiments. In general, embodiments may utilize various modulation and encoding techniques to shape and interpret the compound signals. For example, the compound signals according to some embodiments may be used to encode information by way of Binary Phase Shift Keying ("BPSK"), Quadrature Amplitude Modulation ("QAM"), and higher-order QAM, such as 16QAM. In these encoding schemes, "symbols" are determined from physical parameters of the demodulated signal, and each symbol may encode one or more bits of information. For example, BPSK encodes one bit per symbol, QAM encodes two bits per symbol, and 16QAM encodes four bits per signal. In some embodiments, each compound signal produced by a subarray represents a symbol in such a scheme.

Each 16QAM constellation diagram 202, 204, 206 depicts on an x-axis representing the in-phase signal, and a y-axis representing the quadrature signal portion, every possible four-bit value as represented by the corresponding physical signal parameter values. Each black circle thus represents a symbol, both the physical signal parameter values, and the corresponding digital bit values.

In reference to FIG. 2, the following describes a process for configuring a printed RFID tag to encode a particular sequence of bits. That is, the following described how to select printed antenna elements for a printed RFID antenna array of a printed RFID tag so that the tag encodes any desired data. For purposes of illustration, and without limitation, this description proceeds with the particular example of encoding the bit sequence "0011 1010" using 16QAM and a printed RFID antenna array consisting of four antenna elements, denoted 1, 2, 3, 4, with two subarrays consisting of three antenna elements each. Thus, the first subarray consists of antenna elements 1, 2, and 3, and the second subarray consists of antenna elements 2, 3, and 4. Note that the example is non-limiting: essentially any value can be encoded using any QAM scheme with a printed RFID antenna array of essentially any number of antenna elements and subarrays of any size.

Continuing the example, two 16QAM symbols may be used to encode the data "0011 1010". Select antenna elements 1, 2, and 3 to produce the symbol for "0011" as shown in constellation 202 of FIG. 2. The example continues by determining how to select antenna element 4 such that the subarray consisting of 2, 3, and 4 produces the symbol for "1010". A general technique is presented and then applied to this ongoing example. It follows from Equation (6) that:

$$r[i+1] = r[i] - A_i \sin(2\pi t + \theta_i) + A_{i+1} \sin(2\pi t + \theta_{i+1}) \quad (7)$$

Therefore:

$$A_{i+1} \sin(2\pi t + \theta_{i+1}) = r[i+1] - r[i] + A_i \sin(2\pi t + \theta_i) \quad (8)$$

In terms of Equation (8) for the ongoing example, r[1] has been selected as representing "0011" using antenna elements A, B, and C, and the task is to select physical parameters for antenna element D such that r[2] represents "1010". Therefore, determine the symbol that results when the contributions to the compound signal from antenna element A are removed from r[1]. This represents the subtracted term on the right-hand side of Equation (8) and is illustrated in FIG. 2 by constellation 204. That is, constellation 204 represents the symbol corresponding to antenna elements B and C.

Next, add $A_3 \sin(2\pi t + \theta_3)$, representing the addition on the right hand side of Equation (8). The result is the value for $A_4 \sin(2\pi t + \theta_4)$.

Once the magnitude and phase of the desired element are known, a library can be used to get the antenna element layout. The antenna patch sizing for a certain amplitude response, and a strip length for the proper phase response, may be calculated using techniques disclosed above.

In the ongoing example, antenna element 4 is selected to have the calculated values for $A_4 \sin(2\pi t + \theta_4)$. The result is that when an RFID reader device antenna excites antenna array elements 1, 2, and 3, the data shown in constellation 202 is returned, and when an RFID reader device antenna excites antenna array elements 2, 3, and 4, the data shown in constellation 206 is returned, as desired. This concludes the discussion of the ongoing example.

Figure 3:
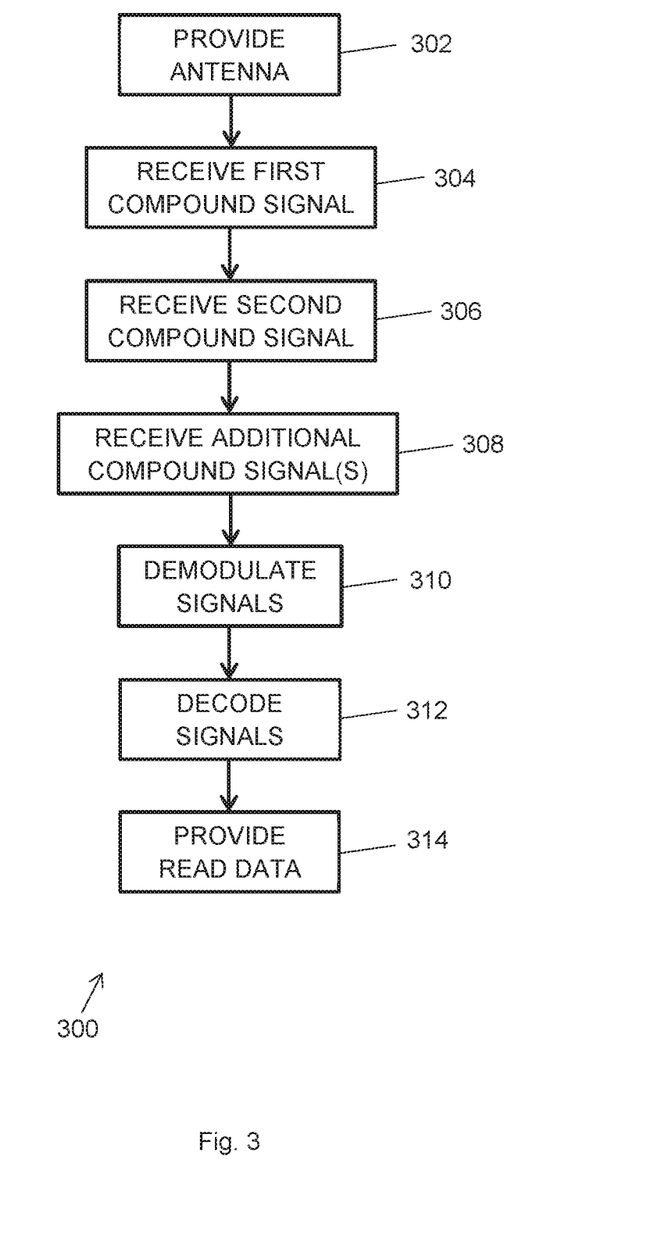
FIG. 3 is a flowchart representing a method of reading a printed RFID antenna array according to VARIOUS embodiments.

FIG. 3 is a flowchart representing a method 300 of reading a printed RFID tag antenna array according to some embodiments. Method 300 may be implemented using device 400 of FIG. 4, for example. That is, method 400 utilizes an RFID reader device and RFID tag as shown and described herein. In particular, the RFID reader includes an appropriately sized antenna to send signals to, and receive signals from, one or more subarrays of a selected size in the RFID tag that it reads.

At block 302, method 300 provides a transmit antenna (e.g., antenna 402 of FIG. 4) of an RFID reader device configured as disclosed herein. The antenna may be provided on any of a variety of ways. In some embodiments, the antenna, and the RFID reader device that includes it, are embodied in a portable hand-held RFID reader device. In such embodiments, the RFID tag may be affixed to an object that is being tracked, and a human or other entity may bring the RFID reader device and the RFID tag in proximity with one another to perform a read operation. In other embodiments, the antenna, and the RFID reader device that includes it, are embodied in some form of infrastructure that controls an access point. For example, the antenna may be situated next to a turnstile or locked door which are released or unlocked, respectively, upon a person successfully presenting appropriate credentials in the form of an RFID tag as disclosed herein.

Note that the antenna provided at block 302 is sized and shaped to send an excitation signal to, and receive a modulated signal from, a subarray of an RFID antenna array in the RFID tag to be read. That is, the antenna is sized and shaped to receive signals from a plurality of antenna elements simultaneously as disclosed herein. Note further that the provided antenna may be a combination transmit-receive antenna, or just a transmit antenna, and a receive antenna may be provided separately.

At block 304, method 300 receives a first compound signal at a receive antenna of the RFID reader device. The receive antenna may be the same as the transmit antenna. The compound signal represents a signal summed from at least two antenna elements of the RFID tag. That is, the compound signal represents the signal received from a subarray. Method 300 may receive the signal at an RFID reader device after a user or other entity "scans" the RFID tag using an appropriate RFID reader device. For example, in the case of a person presenting credentials to be admitted to a secure area, the person may hold his or her RFID tag in proximity to an antenna that is affixed to some infrastructure such as a turnstile or locked door. In the case of an object being tracked, a person or machine may bring the RFID tag in proximity to an antenna, e.g., by using a hand-held RFID reader device. Note that the actions of this block involve reading a first subarray.

At block 306, method 300 receives a second compound signal at the receive antenna of the RFID reader device. The manner of signal acquisition may be essentially identical to that disclosed above in reference to block 304, except that at block 306, a different subarray produces the received compound signal than that subarray that produced the compound signal received per block 304. This may be accomplished in any of a variety of ways. For a human user presenting an RFID tag to the antenna of an RFID reader device (e.g., where the antenna is affixed to some infrastructure), the human use may swipe, slide, or otherwise pass the RFID tag across the antenna such that the first subarray is read per block 304 and then the second subarray is read per block 308 as the RFID tag and antenna pass each other. In the case of an object being tracked, a person or machine may bring a reader device to the RFID tag on the tracked object, e.g., using a hand-held RFID reader device. Note that the subarrays may overlap, e.g., as shown and described above in reference to FIG. 1, so that the distance between the location of the RFID tag where the first compound signal is received by the RFID reader device antenna and the location where the second compound signal is received by the RFID reader device antenna is small, e.g., slightly larger than the width of an antenna element.

At block 308, method 300 receives one or more additional compound signals at the receive antenna of the RFID reader device. The actions of this block are optional; that is, this block may be omitted from some embodiments. The actions of this block are essentially identical to those of block 306, except that additional subarrays may be read. Note that such subarrays may overlap. For example, for an antenna array consisting of five antenna elements 1, 2, 3, 4, 5, the subarray producing the signal of block 304 may consist of antenna elements 1, 2, 3, the subarray producing the signal of block 306 may consist of antenna elements 2, 3, 4, and the subarray producing the signal of block 308 may consist of antenna elements 3, 4, 5. Note that this example is non-limiting; any number of subarrays of any size may be implemented according to contemplated embodiments.

At block 310, a demodulator (e.g., demodulator 406 of FIG. 4) demodulates the received compound signals. The demodulation process outputs values for physical parameters (e.g., amplitude and phase) of the compound signals. Standard demodulation techniques may be used.

At block 312, a decoder (e.g., decoder 408 of FIG. 4) decodes the physical parameter values from block 312 to obtain data values. The decoder may accomplish this using standard techniques, e.g., based on or representing constellation diagrams as known it the art and disclosed herein.

Note that according to some embodiments the actions of blocks 310 and 312 are combined. In such embodiments, a combined demodulator/decoder performs both processes substantially simultaneously. Note that the actions of this block can include outputting data encoded into two or more symbols, represented by the signals received per blocks 304, 305, and possibly 306.

At block 314, method 300 provides the data read from the RFID tag. The method may provide the data in any of a variety of ways. According to some embodiments, the data is transmitted to an electronic persistent storage device, such as a remote database, which stores the data for future use. Embodiments used to track objects may provide the data in this manner, for example. According to some embodiments, the data is automatically and electronically compared to data on an electronically stored whitelist in order to determine whether the RFID tag represents some type of credential. If the data is present on the whitelist, then such embodiments may provide an indication (e.g., display a status on a computer monitor), or unlock a door or other access portal, for example.

Figure 4:
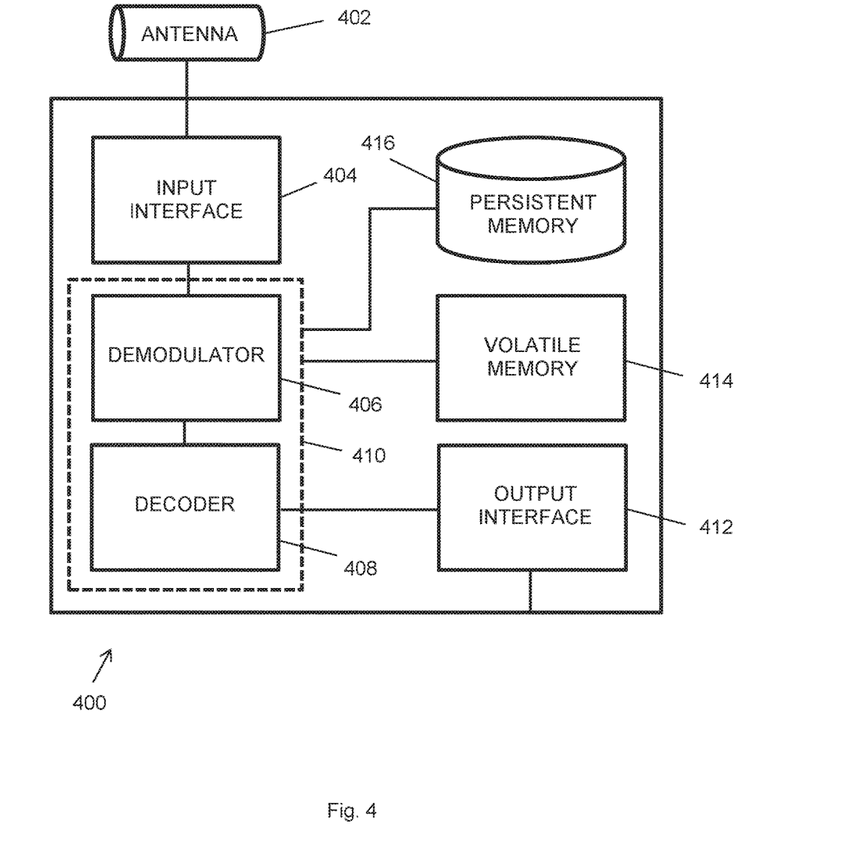
FIG. 4 is a schematic diagram of an RFID reader device suitable for use in some embodiments.

FIG. 4 is a schematic diagram of an RFID reader device 400 suitable for use in some embodiments. RFID reader device 400 may be used to implement the disclosed techniques, e.g., method 300 of FIG. 3. FIG. 4 illustrates various hardware, software, and other resources that can be used for methods according to disclosed examples. In examples as shown, RFID reader device 400 includes one or more processors 410 coupled to volatile memory 414 and persistent memory 416. The processor(s) 410 can communicate with the persistent memory 416 to obtain and execute computer readable instructions to cause processor(s) 410 to implement the techniques disclosed herein, e.g., method 300 of FIG. 3. RFID reader device includes at least one antenna 402, which may be a combined transmit-receive antenna, or may include separate transmit and receive antennas. RFID reader device 400 includes demodulator 406 and decoder 408, which perform the operations described herein, e.g., in reference to blocks 310 and 312 of method 300. According to some embodiments, one or both of demodulator 406 and decoder 408 are implements by processor(s) 410 as executing software. According to some embodiments, one or both of demodulator 406 and decoder 408 are implemented using dedicated hardware modules. Note that according to some embodiments, demodulator 406 and decoder 408 are combined into a single module that performs both operations substantially simultaneously. RFID reader device 400 also includes an output interface 412 communicatively coupled to an output of decoder 408. The nature of output interface 412 may vary, depending on the particular application. For example, output interface 412 may pass the read data to a computer-implemented process that determines whether the data confers sufficient credentials to unlock a door or release a turnstile. In such an example, the process may subsequently unlock the door or release the turnstile. As another example, for tracking an object, output interface 412 may be communicatively coupled to a remotely stored database, e.g., a cloud database. In this example, output interface may include a network interface, to send a network communication to the database for recordation and tracking purposes. Other types of output interfaces are possible, such as a visual interface that visually displays the read data to a human user.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Some embodiments have advantages over prior art techniques. For example, in some embodiments, the data density is increased relative to prior art techniques. This is both through bits per square inch, as the antennas can be packed more closely, as well as bits per antenna array, because each antenna array includes multiple subarrays. The bits per subarray is dependent on the number of antenna elements in the subarray, and the modulation scheme used. A formula for number of bits per RFID tag antenna array is presented below.

$$\frac{\text{bits}}{\text{antenna array}} = \frac{\text{bits}}{\text{symbol}} \cdot \left( \frac{\text{antenna elements}}{\text{antenna array}} - \frac{\text{antenna elements}}{\text{subarray}} + 1 \right) \quad (9)$$

In Equation (9), the term $$\frac{\text{bits}}{\text{antenna array}}$$

represents the number of bits available from an RFID read of an RFID tag that includes an RFID antenna array as disclosed herein, and that is read by an RFID reader as disclosed herein. The term $$\frac{\text{bits}}{\text{symbol}}$$

represents the number of bits per symbol for the modulation scheme used (e.g., QAM, 16QAM, etc.). The term $$\frac{\text{antenna elements}}{\text{antenna array}}$$

represents the total number of antenna elements in the particular antenna array. The term $$\frac{\text{antenna elements}}{\text{subarray}}$$

represents the number of antenna elements per subarray. Note that the former two quantities are independent, except that $$\frac{\text{antenna elements}}{\text{subarray}} < \frac{\text{antenna elements}}{\text{antenna array}}.$$

Consider applying Equation (9) to the particular examiner of an antenna array with 16 antenna elements, subarrays of size 4, and 16QAM used as the modulation scheme. For these parameters, the quantity in the parentheses on the right hand side of Equation (9) works out to: 16 antenna elements per antenna array, minus subarrays of size 4, plus one, for a total of 13 subarrays. Since each subarray carries a symbol, and each symbol carries four bits in 16QAM, the total number of bits that can be transferred by the full antenna array in this example is 52, which gives a bit-per-antenna-element ratio of 3.25. However, an antenna array with 50 antenna elements, with subarrays of size 4, and a modulation scheme of 64QAM (six bits per symbol), would get 5.64 bits per antenna element, with an increase of antenna density.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A radio frequency identification (RFID) system comprising:
    a printed RFID tag comprising a printed RFID antenna array comprising at least three printed RFID antenna elements on a substrate of the RFID tag;
    an electronic RFID reader device comprising at least one RFID reader antenna, at least one of the at least one RFID reader antenna being an RFID transmit and receive antenna configured to simultaneously transmit excitation energy to a number N>1 of printed RFID antenna elements of the printed RFID antenna array, wherein N is less than a total number of printed RFID antenna elements of the printed RFID antenna array;
    wherein the at least one RFID reader antenna is configured to receive a first compound signal from a first plurality consisting of N of the printed RFID antenna elements of the printed RFID antenna array when the printed RFID antenna array is positioned at a first reading location relative to the RFID transmit antenna in response to the excitation energy being transmitted at the first reading location, the first compound signal comprising interfering signals from the first plurality;
    wherein the at least one RFID reader antenna is configured to receive a second compound signal from a second plurality consisting of N of the printed RFID antenna elements of the printed RFID antenna array when the printed RFID antenna array is positioned at a second reading location, different from the first reading location, relative to the RFID transmit antenna in response to the excitation energy being transmitted at the second reading location, the second compound signal comprising interfering signals from the second plurality, wherein the first plurality is different from the second plurality;
    an electronic demodulator communicatively coupled to an output of the RFID reader antenna and configured to demodulate the first compound signal and the second compound signal and produce a first encoded signal and a second encoded signal; and
    an electronic decoder communicatively coupled to an output of the electronic demodulator and configured to obtain read data from at least the first encoded signal and a second encoded signal, wherein the read data is representative of data stored by the printed RFID antenna array.

2. The system of claim 1,
    wherein the at least one RFID reader antenna is configured to receive at least one additional compound signal from at least one additional plurality consisting of N of the printed RFID antenna elements of the printed RFID antenna array when the printed RFID antenna array is positioned at at least one additional reading location relative to the RFID transmit antenna;

wherein the electronic demodulator is configured to demodulate the at least one additional compound signal to produce at least one additional encoded signal; and wherein the electronic decoder is configured to obtain the read data from the first encoded signal, the second encoded signal, and the at least one additional encoded signal.

3. The system of claim 1, wherein each of the at least three printed RFID antenna elements comprises a patch antenna element and a microstrip transmission line.

4. The system of claim 1, wherein the first encoded signal and the second encoded signal encode the read data in amplitude and phase information, and wherein the decoder determines the read data from the amplitude and phase information.

5. The system of claim 4, wherein the decoder comprises a Quadrature Amplitude Modulation (QAM) decoder.

6. The system of claim 5, wherein the QAM decoder comprises a 16QAM decoder.

7. The system of claim 1, wherein the substrate comprises paper, and wherein the printed RFID antenna array lacks a microchip.

8. The system of claim 1, wherein the printed RFID antenna array has an antenna element density of at least 50 printed RFID antenna elements per square inch.

9. The system of claim 1, wherein the first plurality consisting of N of the printed RFID antenna elements of the printed RFID antenna array share a common printed RFID antenna element with the second plurality consisting of N of the printed RFID antenna elements of the printed RFID antenna array.

10. The system of claim 1, wherein the at least three printed RFID antenna elements are arranged linearly on the substrate.

11. A method of reading a printed radio frequency identification (RFID) tag comprising a printed RFID antenna array comprising at least three printed RFID antenna elements on a substrate of the RFID tag, the method comprising:

providing at least one RFID reader antenna, at least one of the at least one RFID reader antenna being an RFID transmit and receive antenna configured to simultaneously transmit excitation energy to a number N>1 of printed RFID antenna elements of the printed RFID antenna array, wherein N is less than a total number of printed RFID antenna elements of the printed RFID antenna array of the RFID tag;

receiving, by at least one RFID reader antenna, a first compound signal from a first plurality consisting of N of the printed RFID antenna elements of the printed RFID antenna array upon the printed RFID antenna array being positioned at a first reading location relative to the RFID transmit antenna in response to the excitation energy being transmitted at the first reading location, the first compound signal comprising interfering signals from the first plurality;

receiving, by the at least one RFID reader antenna, a second compound signal from a second plurality consisting of N of the printed RFID antenna elements of the printed RFID antenna array upon the printed RFID antenna array being positioned at a second reading location different from the first reading location, relative to the RFID transmit antenna, in response to the excitation energy being transmitted at the second reading location, the second compound signal comprising interfering signals from the second plurality, wherein the first plurality is different from the second plurality;

demodulating, by electronic demodulation circuitry, the first compound signal and the second compound signal to obtain a first encoded signal and a second encoded signal;

decoding, by electronic decoding circuitry, at least the first encoded signal and the second encoded signal to obtain read data representing data stored by the printed RFID antenna array.

12. The method of claim 11, further comprising:

receiving at least one additional compound signal from at least one additional plurality consisting of N of the printed RFID antenna elements of the printed RFID antenna array when the printed RFID antenna array is positioned at at least one additional reading location relative to the RFID transmit antenna; and demodulating the at least one additional compound signal to produce at least one additional encoded signal;

wherein the decoding comprises decoding at least the first encoded signal, the second encoded signal, and the at least one additional encoded signal to obtain the read data.

13. The method of claim 11, wherein each of the at least three printed RFID antenna elements comprises a patch antenna element and a microstrip transmission line.

14. The method of claim 11, wherein the first encoded signal and the second encoded signal encode the read data in amplitude and phase information, and wherein the decoding comprises determines the read data from the amplitude and phase information.

15. The method of claim 14, wherein the decoder comprises a Quadrature Amplitude Modulation (QAM) decoder.

16. The method of claim 15, wherein the QAM decoder comprises a 16QAM decoder.

17. The method of claim 11, wherein the substrate comprises paper, and wherein the printed RFID antenna array lacks a microchip.

18. The method of claim 11, wherein the printed RFID antenna array has an antenna element density of at least 50 printed RFID antenna elements per square inch.

19. The method of claim 11, wherein the first plurality consisting of N of the printed RFID antenna elements of the printed RFID antenna array share a common printed RFID antenna element with the second plurality consisting of N of the printed RFID antenna elements of the printed RFID antenna array.

20. The method of claim 11, wherein the at least three printed RFID antenna elements are arranged linearly on the substrate.

* * * * *